(12) United States Patent
Horng et al.

(10) Patent No.: US 6,720,694 B2
(45) Date of Patent: Apr. 13, 2004

(54) SUPPORTING STRUCTURE FOR A ROTOR (75) Inventors: Alex Horng, Kaohsiung (TW);
Ching-shen Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 46 days.

(21) Appl. No.: 09/824,725

(22) Filed: Apr. 4, 2001

(65) Prior Publication Data

US 2002/0145183 A1 Oct. 10, 2002

(51) Int. Cl.$^7$ ................................................ H02K 7/08
(52) U.S. Cl. ...................................... 310/90; 310/67 R
(58) Field of Search .............................. 310/90, 67 R; 384/114, 192, 193, 226, 227, 228, 271

(56) References Cited

U.S. PATENT DOCUMENTS

| | | | | |
|---|---|---|---|---|
| 4,620,139 A | * | 10/1986 | Egami et al. | 318/254 |
| 4,922,162 A | * | 5/1990 | Shiraki et al. | 310/268 |
| 5,258,672 A | * | 11/1993 | Wrobel | 310/42 |
| 5,274,289 A | * | 12/1993 | Wrobel | 310/90 |
| 5,363,003 A | * | 11/1994 | Harada et al. | 310/67 R |
| 5,715,116 A | * | 2/1998 | Moritan et al. | 360/99.08 |
| 5,942,823 A | * | 8/1999 | Higuchi et al. | 310/90 |
| 6,000,919 A | * | 12/1999 | Hsieh | 417/423.15 |
| 6,183,221 B1 | * | 2/2001 | Hsieh | 417/423.12 |
| 6,267,567 B1 | * | 7/2001 | Hsieh | 417/354 |
| 6,318,976 B1 | * | 11/2001 | Hsieh | 417/423.12 |
| 6,356,408 B1 | * | 3/2002 | Nii et al. | 360/98.07 |
| 6,455,961 B1 | * | 9/2002 | Higuchi | 310/67 R |

OTHER PUBLICATIONS

"Merriam–Webster's Collegiate Dictionary", Tenth Edition, p. 1194.*

* cited by examiner

Primary Examiner—Dang Le
(74) Attorney, Agent, or Firm—Bacon & Thomas, PLLC (57) ABSTRACT A supporting structure includes a metal axle tube, a holding member securely mounted in the axle tube, a supporting member securely mounted in the axle tube and including a supporting portion, and a fixing member securely mounted in the axle tube and including an opening. The holding member includes a hole and an inner flange is formed on an inner periphery defining the hole. A shaft is provided to a center of the rotor and includes an engaging groove. The shaft is extended through the hole of the holding member and the opening of the fixing member with an end face of a distal end of the shaft rotatably resting on the supporting portion of the support member and with the fixing member engaging with the engaging groove of the shaft, whereby the shaft and the inner flange of the holding member have a slight contact therebetween.

17 Claims, 7 Drawing Sheets

SUPPORTING STRUCTURE FOR A ROTOR

BACKGROUND OF THE INVENTION

1. Field of the Invention

The present invention relates to a supporting structure for a rotor, wherein the rotor shaft and the supporting member of the supporting structure have the smallest contact area while providing stable and non-skew rotation for the rotor.

2. Description of the Related Art

Figure 1:
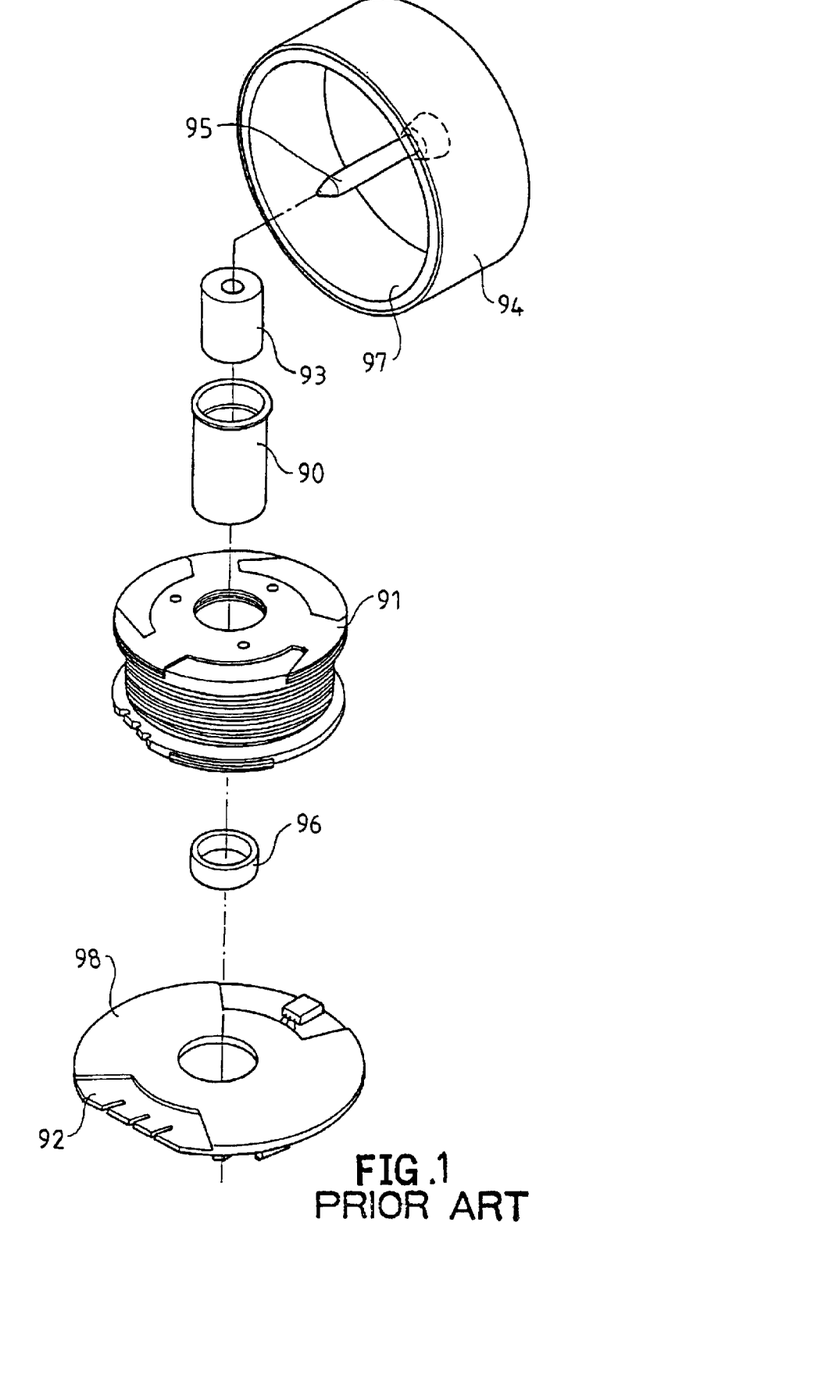
FIG. 1 is an exploded perspective view of a conventional motor structure.
Figure 2:
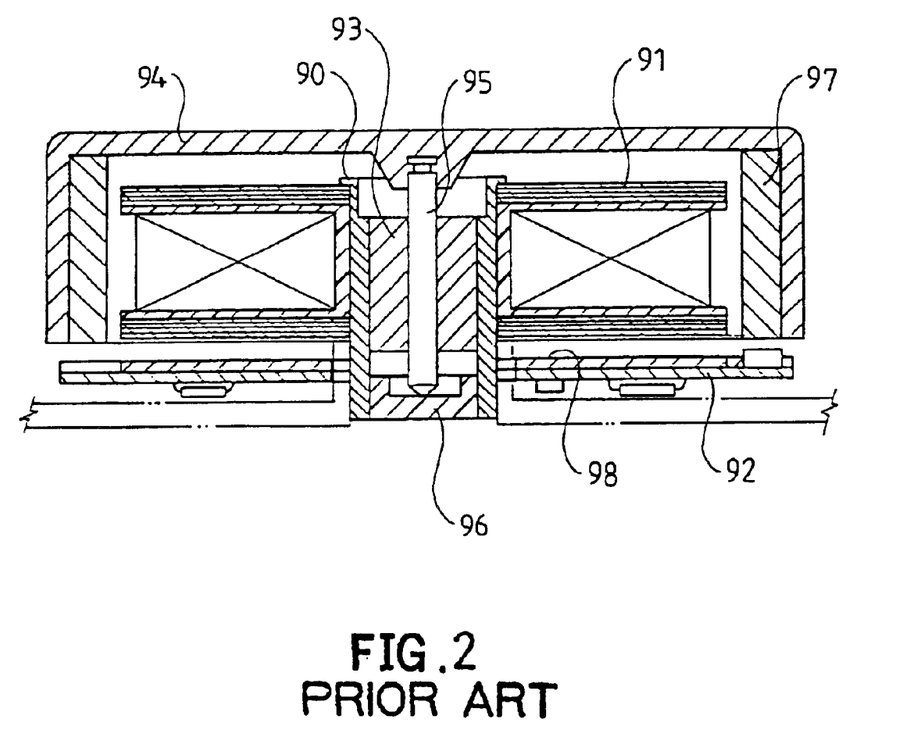
FIG. 2 is a sectional view of the conventional motor structure in FIG. 1.

FIGS. 1 and 2 of the drawings illustrate a conventional motor structure that comprises a metal axle tube 90, a stator 91 mounted around the axle tube 90, a circuit board 92, and a balance plate 98. An oily bearing 93 is tightly engaged in the axle tube 90 for rotatably supporting a shaft 95 of a rotor 94. A distal end of the shaft 95 is rotatably supported by a support member 96. The rotor 94 rotates stably by means of mutual attraction between a permanent magnet 97 on the rotor 94 and the balance plate 98.

In such a conventional motor, the rotor 94 could not rotate smoothly, as the lubricating oil in the oily bearing 93 leaks after the oily bearing 93 has been used for a period of time. In addition, the shaft 95 of the rotor 94 and the oily bearing 93 have a relatively large contact area therebetween. As a result, a relatively large friction exists and a larger noise is generated during rotation of the rotor 94. Furthermore, the cost for processing and manufacturing such a conventional motor is high.

SUMMARY OF THE INVENTION

It is the primary object of the present invention to provide a supporting structure for a rotor. The supporting structure can be manufactured conveniently. In addition, the shaft of the rotor and the supporting member for the shaft have a relatively smaller contact area therebetween.

In accordance with the present invention, a supporting structure is provided for the rotor and includes a metal axle tube, a holding member securely mounted in the axle tube, a supporting member securely mounted in the axle tube and including a supporting portion, and a fixing member securely mounted in the axle tube and including an opening. The holding member includes a hole and an inner flange is formed on an inner periphery defining the hole.

A shaft is provided to a center of the rotor and includes an engaging groove. The shaft is extended through the hole of the holding member and the opening of the fixing member with an end face of a distal end of the shaft rotatably resting on the supporting portion of the support member and with the fixing member engaging with the engaging groove of the shaft, whereby the shaft and the inner flange of the holding member have a slight contact therebetween.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 3:
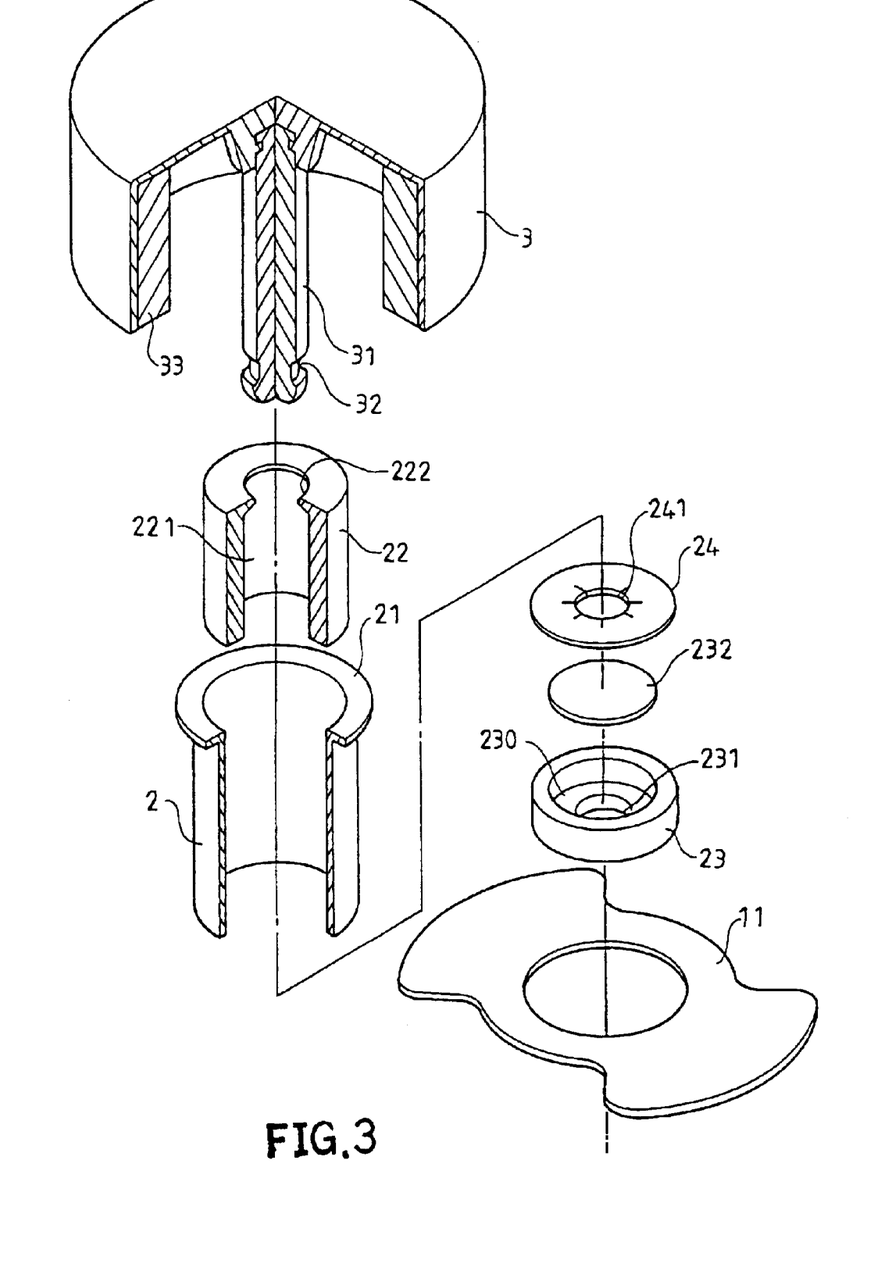
FIG. 3 is an exploded perspective view of a supporting structure for a rotor in accordance with the present invention.
Figure 4:
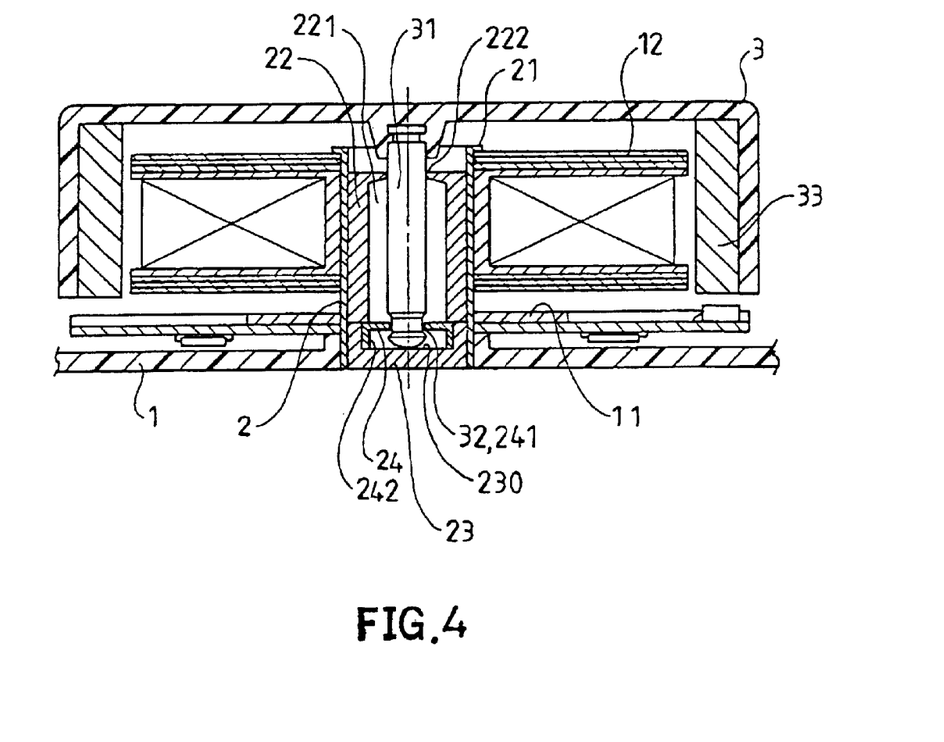
FIG. 4 is a sectional view of a motor having the supporting structure in FIG. 3.

Referring to FIGS. 3 and 4, a supporting structure for a rotor 3 in accordance with the present invention generally includes a base 1 (FIG. 4) and a metal axle tube 2. The base 1 may be a casing of any conventional motor or heat-dissipating fan. A balance plate 11 is mounted to the base 11 and made from magnetically conductive material for providing mutual attraction between the balance plate 11 and a permanent magnet 33 on the rotor 3.

The metal axle tube 2 is made from magnetically conductive material and includes an end securely mounted to the base 1. A conventional stator bobbin 12 is mounted around the axle tube 2 and a flange 21 is formed on the other end of the axle tube 2 for preventing disengagement of the stator bobbin 12. Mounted in the axle tube 2 is a holding member 22, a supporting member 23, and a fixing member 24, which are securely mounted in the axle tube 2 by any suitable means. The fixing member 24 is sandwiched between the holding member 22 and the support member 23 to provide a simple arrangement, best shown in FIG. 4. The holding member 22 includes a hole 221 through which the shaft 31 of the rotor 3 extends. It is advantageous to provide the smallest contact area between the shaft 31 and the holding member 22. As illustrated in FIGS. 3 and 4, the holding member 22 is tubular and includes an inner flange 222 formed on an inner periphery defining the hole 221. The support member 23 includes a supporting portion 230 having a hole 231 that is covered by a cover 232. Alternatively, the supporting portion 230 may be solid without any hole; namely, the supporting portion 230 is a closed bottom of the support member 23. The fixing member 24 may be a conventional retaining ring having an opening 241 through which the shaft 31 of the rotor 3 extends. An inner periphery defining the opening 241 of the fixing member 24 includes a plurality of radial slits or cuts (not labeled) to allow easy passage of the shaft 31 of the rotor 3.

The shaft 31 of the rotor 3 is located in a center of the rotor 3 and extends through the hole 221 of the holding member 22 and the opening 241 of the fixing member 24 with an end face of the distal end of the shaft 31 rotatably resting on the supporting portion 230 of the support member 23. The shaft 31 includes an annular engaging groove 32 defined in an outer periphery thereof for engaging with the fixing member 24. Thus, disengagement of the rotor 3 is prevented while the shaft 31 and the flange 222 of the holding member 22 have a very small gap therebetween or have a slight contact therebetween. The permanent magnet 33 on the rotor 3 and the balance plate 11 attract each other.

Figure 5:
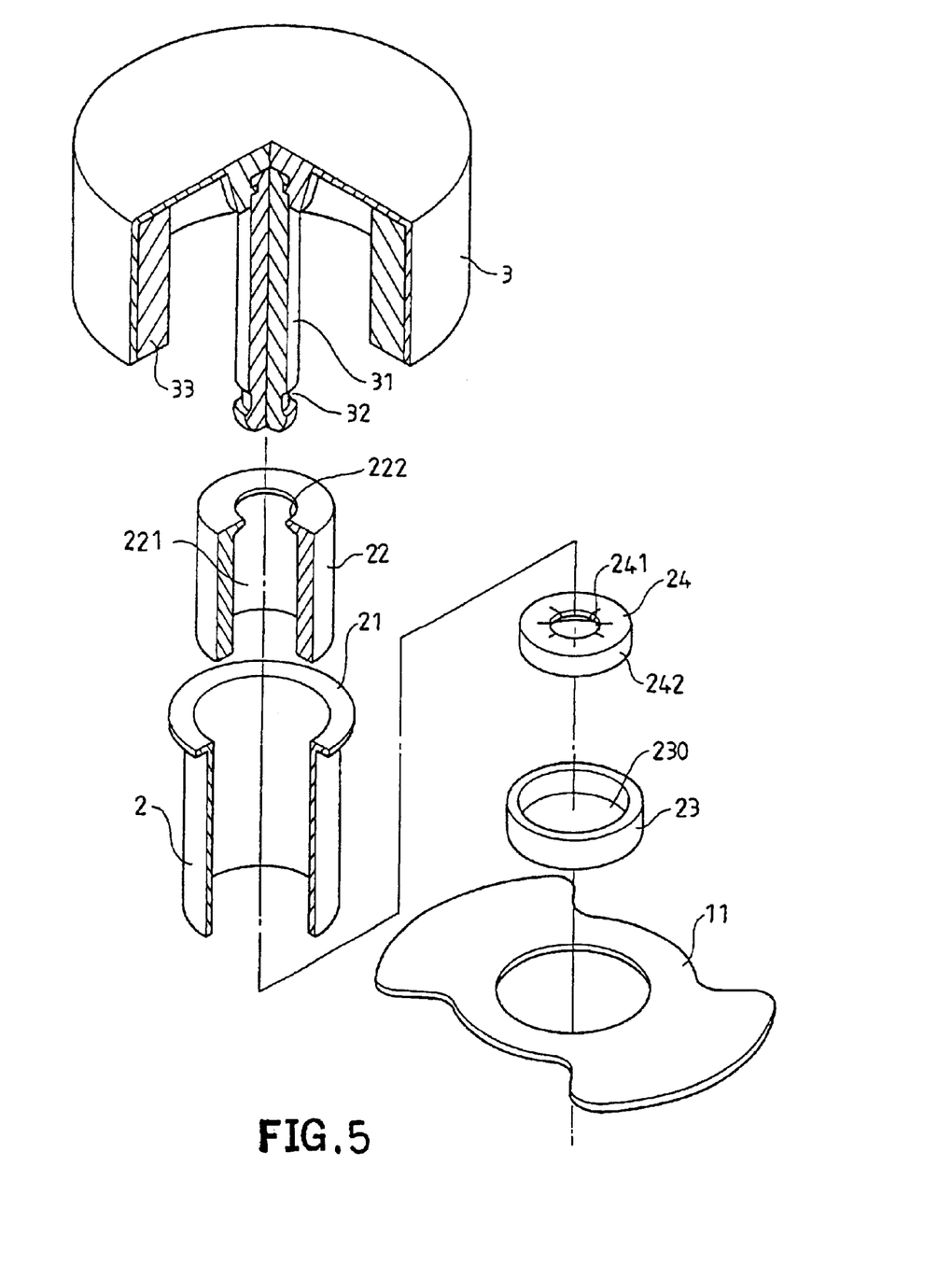
FIG. 5 is an exploded perspective view of a modified embodiment of the supporting structure in accordance with the present invention.
Figure 6:
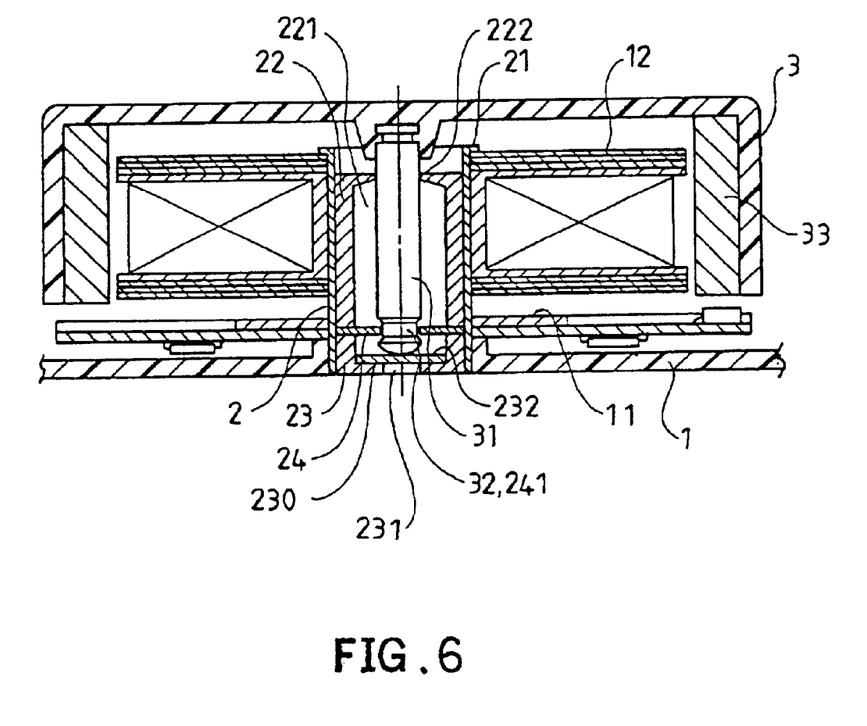
FIG. 6 is a sectional view of a motor having the supporting structure in FIG. 5.

FIGS. 5 and 6 illustrate a modified embodiment of the supporting structure in accordance with the present invention, wherein the supporting portion 230 of the support member 23 is solid and the fixing member 24 has an annular wall 242 and an opening 241 that allows easy passage of the shaft 31 of the rotor 3.

More particularly, the metal axle tube 2 is securely mounted to the base 1 (FIG. 6) that has a balance plate 11 mounted thereon. A stator bobbin 12 is mounted around the axle tube 2. Mounted in the axle tube 2 are a holding member 22 and the support member 23 that receives the fixing member 24. An end face of the annular wall 242 of the fixing member 24 abuts against the supporting portion 230 of the support member 23. In this embodiment, the holding member 22 abuts against a top face of the fixing member 24.

The shaft 31 of the rotor 3 is located in a center of the rotor 3 and extends through the hole 221 of the holding member 22 and the opening 241 of the fixing member 24. The shaft 31 includes an annular engaging groove 32 defined in an outer periphery thereof for engaging with the fixing member 24. The shaft 31 and the flange 222 of the holding member 22 have the smallest gap therebetween or have a slight contact therebetween. An end face of the distal end of the shaft 31 rotatably rests on the supporting portion 230 of the support member 23 to provide stable rotation with least friction.

Figure 7:
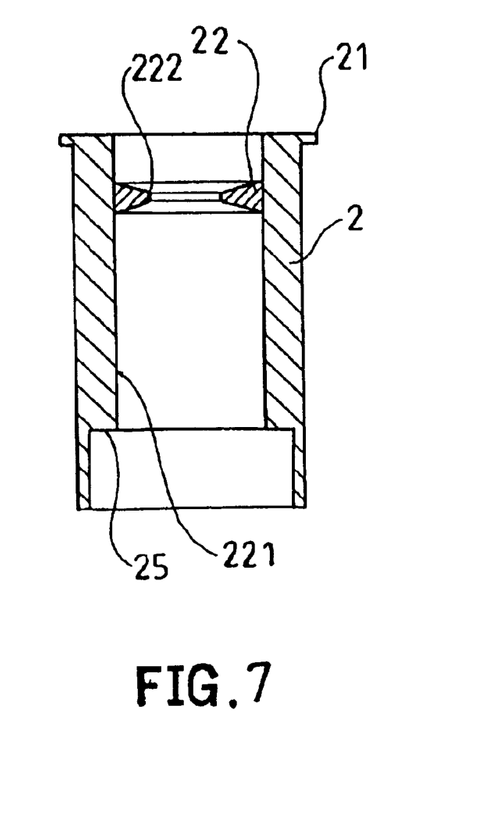
FIG. 7 is a sectional view illustrating a modified embodiment of a holding member of the supporting structure in accordance with the present invention.

FIG. 7 illustrates a modified embodiment of the holding member 22, wherein the holding member 22 is in the form of a ring 222 that is securely mounted to an inner periphery defining the hole 221 of the axle tube 2. In addition, a lower end of the hole 221 of the axle tube 2 has a stepped portion 25 for abutting against the fixing member 24 and the support member 23. Thus, the fixing member 24 can be securely retained in place.

Figure 8:
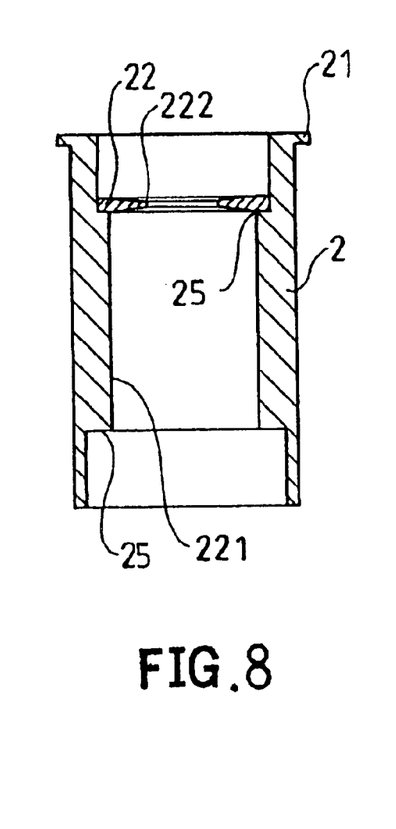
FIG. 8 is a sectional view illustrating another modified embodiment of the holding member in accordance with the present invention.

FIG. 8 illustrates another modified embodiment of the holding member 22, wherein the holding member 22 is in the form of a ring 222 that is securely mounted to an inner periphery defining the hole 221 of the axle tube 2. In addition, the hole 221 of the axle tube 2 has an upper stepped portion 26 on the which the ring 222 rests and a lower stepped portion 25 for abutting against the fixing member 24 and the support member 23. Thus, an end face of the distal end of the shaft 31 of the rotor 3 rests on the supporting portion 230 of the support member 23, and the ring 222 and the shaft 31 have the smallest gap therebetween or have a slight contact therebetween, thereby providing the smallest friction area and the lowest noise during rotation of the rotor 3.

Figure 9:
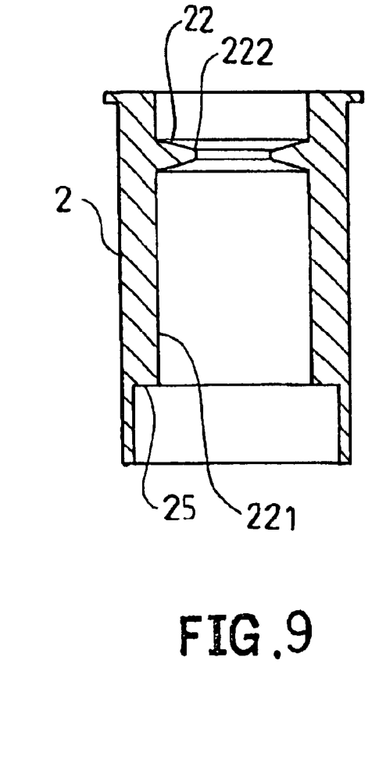
FIG. 9 is a sectional view illustrating a further modified embodiment of the holding member in accordance with the present invention.

FIG. 9 illustrates a further modified embodiment of the invention, wherein the holding member 22 is in the form of a ring 222 that is directly formed on an inner periphery defining the hole 221 of the axle tube 2. The ring 222 and the shaft 31 have the smallest gap therebetween or have a slight contact therebetween. In addition, a lower end of the hole 221 of the axle tube 2 has a stepped portion 25 for abutting against the fixing member 24 and the support member 23. Thus, an end face of the distal end of the shaft 31 of the rotor 3 rests on the supporting portion 230 of the support member 23, and the ring 222 and the shaft 31 have the smallest gap therebetween or have a slight contact therebetween, thereby providing the smallest friction area and the lowest noise during rotation of the rotor 3.

According to the above description, it is appreciated that since the shaft 31 of the rotor 3 rests on the supporting portion 230 of the support member 23 merely at the distal end face of the shaft 31 and since the shaft 31 and the ring or flange 222 of the holding member 22 have the smallest gap therebetween or have a slight contact therebetween, a stable and non-skew rotation of the rotor 3 is obtained while minimizing the noise and friction. Processing and manufacturing the rotor 3 are easy and the cost thereof is reduced accordingly.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A combination of a rotor and a supporting structure for the rotor, the combination comprising:

a base provided with a metal axle tube;

a holding member securely mounted in the metal axle tube, the holding member including a hole and an inner flange formed on an inner periphery defining the hole, said inner flange having an axial thickness that is thin relative to an axial length of the holding member to minimize contact between said inner flange and a shaft extending through said hole;

a supporting member securely mounted in the metal axle tube and including as supporting portion;

a fixing member securely mounted in the metal axle tube and including an opening;

a rotor having a permanent magnet, the shaft being provided at a center of the rotor and including an engaging groove, the shaft being extended through the opening of the fixing member with an end face of a distal end of the shaft rotatably resting on the supporting portion of the support member and with the fixing member engaging with the engaging groove of the shaft, whereby the shaft and the thin inner flange of the holding member have a slight contact therebetween; and a balance plate mounted to the base and made from magnetically conductive material, the balance plate and the permanent magnet attracting each other to thereby provide an auxiliary balance force for rotation of the shaft on the thin inner flange of the holding member.

2. The combination as claimed in claim 1, wherein the axle tube includes a hole, and wherein the holding member, the support member, and the fixing member are tightly engaged with an inner periphery defining the hole of the axle tube.

3. The combination as claimed in claim 1, wherein the axle tube includes a hole, the holding member and the support member being tightly engaged with an inner periphery defining the hole of the axle tube, the fixing member being sandwiched between the holding member and the support member.

4. The combination as claimed in claim 1, wherein the holding member is a ring directly mounted to an inner periphery of the axle tube.

5. The combination as claimed in claim 1, wherein the holding member is a ring, the axle tube including an inner periphery having a stepped portion on which the ring rests.

6. The combination as claimed in claim 1, wherein the axle tube includes an inner periphery having a stepped portion against which the support member abuts.

7. The combination as claimed in claim 1, wherein the support member includes a closed bottom that forms the supporting portion.

8. The combination as claimed in claim 1, wherein the supporting portion of the support member includes a hole, further comprising a cover for covering the hole, the end face of the distal end of the shaft rotatably resting on the cover.

9. The combination as claimed in claim 1, wherein the fixing member includes an annular wall which abuts against the supporting portion of the support member.

10. The combination as claimed in claim 1, wherein the axle tube includes an inner periphery having a stepped portion against which the fixing member and the supporting member abuts.

11. The combination as claimed in claim 1, wherein the axle tube includes an inner periphery having a stepped portion against which the fixing member abuts.

12. A combination of a rotor and a supporting structure for the rotor, the combination comprising:
- a base provided with a metal axle tube including a thin ring formed on an inner periphery thereof, said thin ring having an axial thickness that is thin relative to an axial length of the holding member to minimize contact between said inner flange and a shaft extending through said hole;
- a supporting member securely mounted in the metal axle tube and including as supporting portion;
- a fixing member securely mounted in the metal axle tube and including an opening;
- a rotor having a permanent magnet, the shaft being provided at a center of the rotor, the shaft including an engaging groove, the shaft being extended through the thin ring of the axle tube and the opening of the fixing member with an end face of distal end of the shaft rotatably resting on the supporting portion of the support member and with the fixing member engaging with the engaging groove of the shaft, whereby the shaft and the thin ring have a slight contact therebetween; and
- a balance plate mounted to the base and made from magnetically conductive material, the balance plate and the permanent magnet attracting each other to thereby provide an auxiliary balance force for rotation of the shaft on the thin ring of the base.

13. The combination as claimed in claim 12, wherein the axle tube includes an inner periphery having a stepped portion against which the fixing member abuts.

14. The combination as claimed in claim 12, wherein the support member includes a closed bottom that forms the supporting portion.

15. The combination claimed in claim 12, wherein the supporting portion of the support member includes a hole, further comprising a cover for covering the hole, the end face of the distal end of the shaft rotatably resting on the cover.

16. The combination as claimed in claim 12, wherein the fixing member includes an annular wall which abuts against the supporting portion of the support member.

17. The combination as claimed in claim 12, wherein the axle tube includes an inner periphery having a stepped portion against which the fixing member and the supporting member abuts.

* * * * *